Feb. 25, 1930.  A. J. BOWIE  1,748,753
ELECTRO MAGNETIC POWER TRANSMISSION MECHANISM
Filed July 30, 1925  2 Sheets-Sheet 1
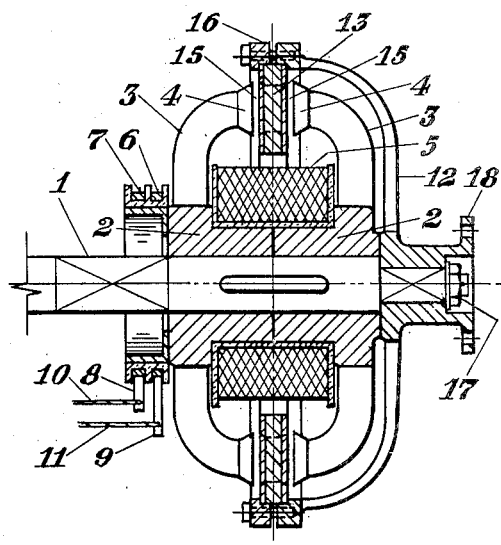
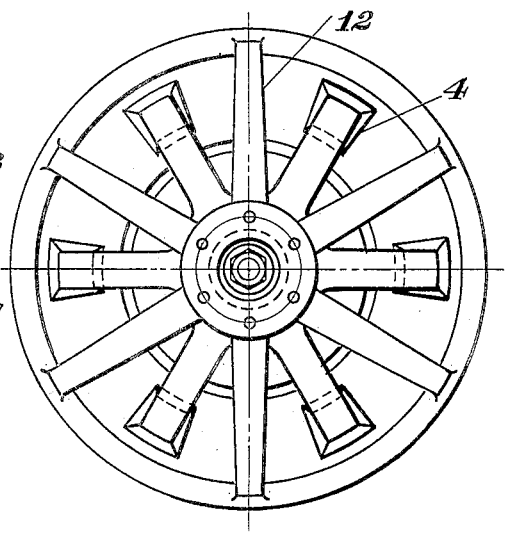
Fig.1.  Fig.2.
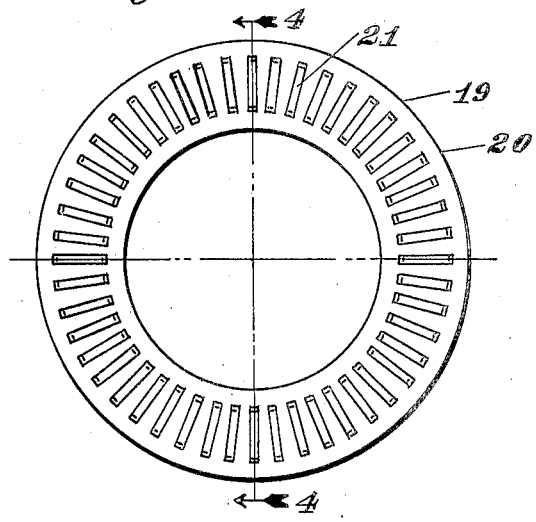
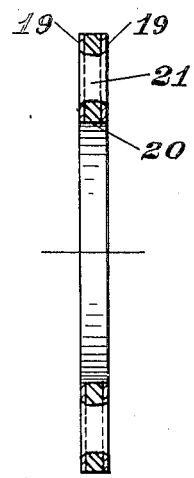
Fig.3.  Fig.4.
Augustus Jesse Bowie
INVENTOR Augustus Jesse Bowie
INVENTOR Patented Feb. 25, 1930

1,748,753

UNITED STATES PATENT OFFICE

AUGUSTUS JESSE BOWIE, OF SAN FRANCISCO, CALIFORNIA

ELECTROMAGNETIC POWER-TRANSMISSION MECHANISM

Application filed July 30, 1925. Serial No. 47,153.

This invention relates to improvements in electromagnetic power transmission mechanism and has particular reference to its application for use in automobiles. It involves improvements in the mechanism for power transmission without direct mechanical friction or driving.

For automobile use one application consists in a mechanism performing the functions of the usual friction clutch, except that no mechanical contact is required and hence there are no rubbing surfaces to wear.

Fig. 1 shows a sectional elevation of the invention with particular reference to use for automobile work.

Fig. 2 shows an end view of the same.

Fig. 3 shows a plan of the rotating element.

Fig. 4 shows a sectional view of the same.

Figure 5:
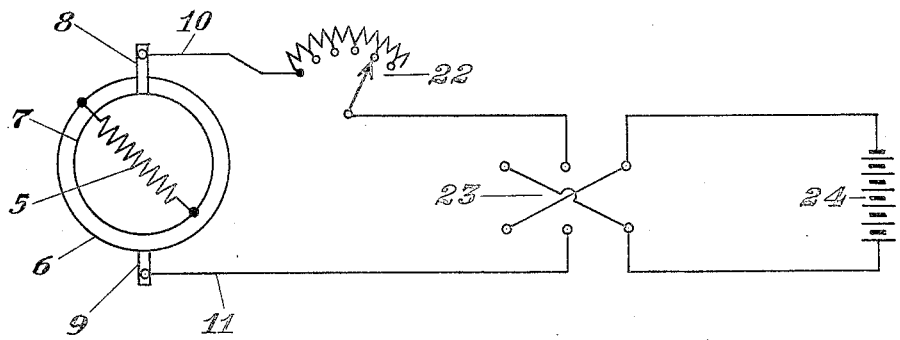
Fig. 5 shows a method of diagrammatical control.

In Figs. 1 and 2, 1, is a power shaft driven from a suitable prime mover to which is fastened a central core, 2, of magnetic material having radial arms, 3, ending in pole pieces, 4. 5, is a magnet coil mounted upon the central core 2. The pole faces 4, 4, on opposing sides of the structure face each other directly and provide air gaps 15, 15, between the same. The ends of the coil 5, are connected respectively to slip rings 6 and 7, upon which bear contactor brushes 8 and 9 respectively, connected to leads 10 and 11, and to any suitable source of electric power, such as a storage battery.

The energizing of the coil causes lines of force to be set up in the body of the mechanism and to flow across the air gaps 15, 15, between the pole faces 4, 4. Mounted loosely on shaft 1, and projecting within the air gaps 15, 15, is a secondary conductor 13, mounted on the spider 12, which turns loosely on shaft 1. Rotor 13, which is attached to spider 12 by clamp ring 16, consists of conductors 19 and 20, made of material having high electrical conductivity. These conductors are preferably laminated in planes normal to the axes about which they revolve, for constructional purposes, tho they may be built solid if desired. They are provided with slots in which iron pieces 21, project between the two faces, being riveted over the outside faces, thus holding them rigidly in place and also securing thoroughly in a mechanical manner the conductors 19 and 20, making the construction of the rotor thoroughly rigid. The iron pieces 21, are preferably made of laminated iron to provide a high permeability and to allow ready demagnetization.

These iron pieces are so riveted as to provide an increased area upon each of the external surfaces, which is important in cutting down the reluctance of the magnetic path. This is shown particularly in Fig. 4.

It is very desirable, especially for automotive use that the weight of the rotor be as small as possible. Therefore, I make the conductor 20, up of aluminum. However, aluminum being relatively soft, is unsuitable for mechanical construction of the outer face. For this reason the exterior disks 19, 19, of the runner 13, are made of material harder than aluminum, thus combining the requisite mechanical strength, lightness and conductivity. The conductors 19, 19, may be made of duralumin which is of considerable strength, or else, hard copper or other materials which will effect the same purpose.

For use as a clutch it is important that the demagnetizing action be very prompt, and for this reason I provide the control mechanism shown diagrammatically in Fig. 5, for the operation of the clutch. In this figure 5 indicates the coil with 8 and 9 contactor brushes, 10 and 11, leads therefrom. 24 is a battery, 22 is a rheostat and 23 a pole reversing switch. In breaking the circuit the current is gradually weakened by insertion of resistance thru the rheostat 22, and then by a reversal of the current thru the coil, by the double throw switch 23, thus tending to demagnetize the magnetic circuit before the final break.

Figure 7:
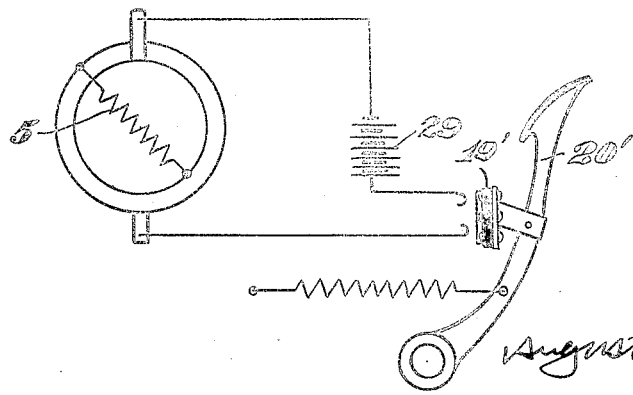
Fig. 7 shows a diagram of another method of control.

In the application of the invention for automotive work one convenient arrangement consists of placing switch control 19' on the pedal 20' as shown in Fig. 7, which pedal is usually used in operating a frictional clutch. Thus, when the pedal is out, corresponding to the in position of the clutch, full current passes thru the coil and when the pedal is depressed, current passing thru the coil is cut off. With this arrangement however, current would flow continuously thru the coil unless the control switch for the clutch coil were opened. Since this may be inconvenient, it is highly desirable to have automatic means for interrupting this current, unless the current is required. The preferred type of construction is to have the current controlled thru the gear shaft in such a manner that when the gear shift is in neutral no current can flow thru the coil.

Figure 6:
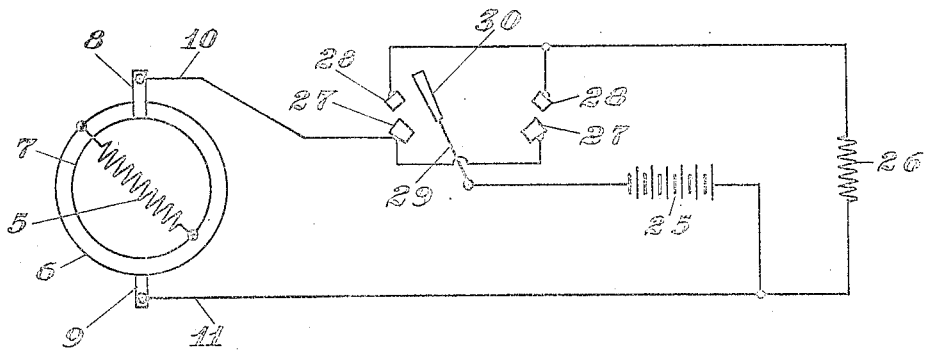
Fig. 6 shows a diagrammatic plan of current control for application to the usual gear shift lever of an automobile.

Fig. 6 shows diagrammatically the operation of a switch of this nature, which opens the circuit thru the coil 5, when the gear shift lever is in neutral position. With the control as previously outlined being governed by the clutch pedal this switch will not be called upon to operate in the shifting of gears, altho if desired the entire control can be operated by the gear shift, thus doing away entirely with the clutch pedal. In fact, the switching arrangement shown in Fig. 5 can be readily combined with the clutch switch shown in Fig. 6. In any event, with the construction shown in Fig. 6, when the clutch is in neutral, no current can flow thru the coil. In Fig. 6, 25 represents the battery, 26 is a non-inductive resistance to take the spark of discharge when breaking the circuit thru the coil 5. 27, 27, are contacts adapted to complete the circuit thru the coil 5, by means of the contactor bar 30, mounted on lever 29, connected to the battery 25. The bar 30, is operated by the gear shifting lever. 28, 28, are contacts for throwing in the shunt discharge resistance 26, in the normal operation of the lever.

What I claim is:

1. A power transmission mechanism comprising a positively driven primary element, a secondary element driven therefrom, said primary and secondary elements forming an electro-magnetic induction system involving an inducing magnet having opposing polar faces, and an induced element made up of a non-magnetic electrical conductor provided with slots between the faces adjacent to said polar faces, and iron pieces inserted in said slots and supported solely by said conductor, said induced element being interposed in the air gap between said polar faces.

2. A power transmission mechanism comprising a positively driven primary element, a secondary element driven therefrom, said primary and secondary elements forming an electro-magnetic induction system including an inducing element having opposing faces, and an induced element composed of an electrical conductor, said induced element being interposed in the air gap between said polar faces, a coil for energizing said mechanism, in combination with a gear shift lever adapted for automobile operation, a switch controlling the current for energizing said coil and operated by said gear shift lever, and means for cutting off the current thru said coil when said gear shift is in neutral position.

In testimony whereof, I affix my signature.

AUGUSTUS JESSE BOWIE.